United States Patent [19]

Suehiro

[11] 4,056,683
[45] Nov. 1, 1977

[54] AUDIO TRANSMITTING AND RECEIVING SYSTEM

[75] Inventor: Akio Suehiro, Yokohama, Japan
[73] Assignee: Hitachi, Ltd., Japan
[21] Appl. No.: 617,639
[22] Filed: Sept. 29, 1975

[30] Foreign Application Priority Data

Oct. 2, 1974  Japan ............................... 49-112756

[51] Int. Cl.$^2$ ............................................. H04Q 3/00
[52] U.S. Cl. .................... 179/1 AT; 84/1.01; 179/1 G
[58] Field of Search ............... 179/1 AT, 1 B, 1 SM, 179/15 BA, 15 AL, 15 AM, 1 G; 328/158; 84/1.01; 340/172.5

[56] References Cited

U.S. PATENT DOCUMENTS

| 3,641,496 | 2/1972 | Slavin | 179/1 SM |
| 3,755,786 | 8/1973 | Dixon et al. | 179/15 AL |
| 3,757,053 | 9/1973 | Pell et al. | 179/1 H |
| 3,767,859 | 10/1973 | Doering et al. | 179/1 H |
| 3,928,722 | 12/1975 | Nakata | 179/1 SM |

OTHER PUBLICATIONS

W. Buckholz, "Computer Controlled Audio Output," IBM Tech. Bull., vol. 3, No. 5, Oct. 1960.

Primary Examiner—Kathleen H. Claffy
Assistant Examiner—E. S. Kemeny
Attorney, Agent, or Firm—Craig & Antonelli

[57] ABSTRACT

A system for transmitting and receiving audio information includes an audio response unit for reading out pre-recorded digital audio information and editing the digital audio information in digital signal form. A transmitter is provided for transmitting the edited digital audio information, and a converter is provided at the receiving side for converting the transmitted digital audio information into an analog audio signal. One feature of the invention is that the announcer audio information in digital form may be mixed with the pre-recorded audio information in digital signal form.

2 Claims, 2 Drawing Figures

AUDIO TRANSMITTING AND RECEIVING SYSTEM

BACKGROUND OF THE INVENTION

1. Field of the Invention

The present invention relates to audio transmitting and receiving systems, and more particularly to such a system which can be effectively applied to automatic broadcasting systems and the like.

2. Description of the Prior Art

Society has become information-oriented to even greater extent with the progress of information technology, and it has become possible to offer automatically various kinds of services to the public without the aid of any human hands. In railway stations, for example, an automatic broadcasting system has been extensively employed which is combined with an automatic control system, such as an automatic train control system, so as to automatically broadcast the departure and arrival of trains.

An audio response unit employed in such an automatic broadcasting system is generally installed in, for example, a central control room, and audio signal outputs of the audio response unit are transmitted to individual railway stations by cables or equivalent transmission means. However, the audio signals are subject to more attenuation with the increase in the transmission distance, and noises tend to be mixed in the audio signals being transmitted thereby greatly deteriorating the quality of the audio signals reproduced and amplified at the receiving end.

In an effort to obviate these drawbacks, a method has been proposed in which an analog audio signal output of an audio response unit is converted into a PCM (Pulse Code Modulation) signal by a pulse code modulating terminal unit to be transmitted to the receiving end by means such as a cable, and the PCM signal is demodulated into an analog signal at the receiving end. In this method, audio signals are first recorded in analog form on a recording drum in the audio response unit, and the recorded audio signals are then continuously read out from the recording drum and applied to a time division switch. Instructions are applied from control means such as a control computer, to the time division switch, so that the audio signals are converted into PAM (Pulse Amplitude Modulation) signals to edit the messages to be alloted to the individual channels. The converted signal is called a channel multiplex PAM signal. PAM signals corresponding to the individual channels of the channel multiplex signal are separated by channel separation pulses and then passed through demodulators to be converted into analog audio signals. In the case of applications to broadcasting and the like services, arrangement is made so that interruption of additional audio information can be made in each channel. To this end, a control console is provided to assign the interrupted channel, and the interrupting audio information is applied to an analog mixer together with the analog audio signal to be mixed with the latter. The analog signal output of the analog mixer is transmitted after being passed through a suitable PCM means since it is necessary to convert the analog signal into a PCM signal suitable for the long-distance transmission. This method is however defective in that the necessity for special provision of the additional PCM means leads to an increase in the number of system components resulting in further complexity of the structure.

SUMMARY OF THE INVENTION

It is a primary object of the present invention to provide a novel and improved audio transmitting and receiving which obviates the prior art defects pointed out above and can reproduce audio information with high fidelity in spite of the fact that the system is simple in construction and inexpensive.

The present invention is featured by the fact that audio signals recorded on a recording medium in an audio response unit are edited in PCM signal form, the edited channel multiplex PCM signal is sent over a transmission path or highway, and the transmitted signal is then subject to channel separation at respective receiving ends to be demodulated into analog audio signals.

DESCRIPTION OF THE PREFERRED EMBODIMENT

One form of prior art audio transmitting and receiving system will be described at first with reference to FIG. 1.

Figure 1:
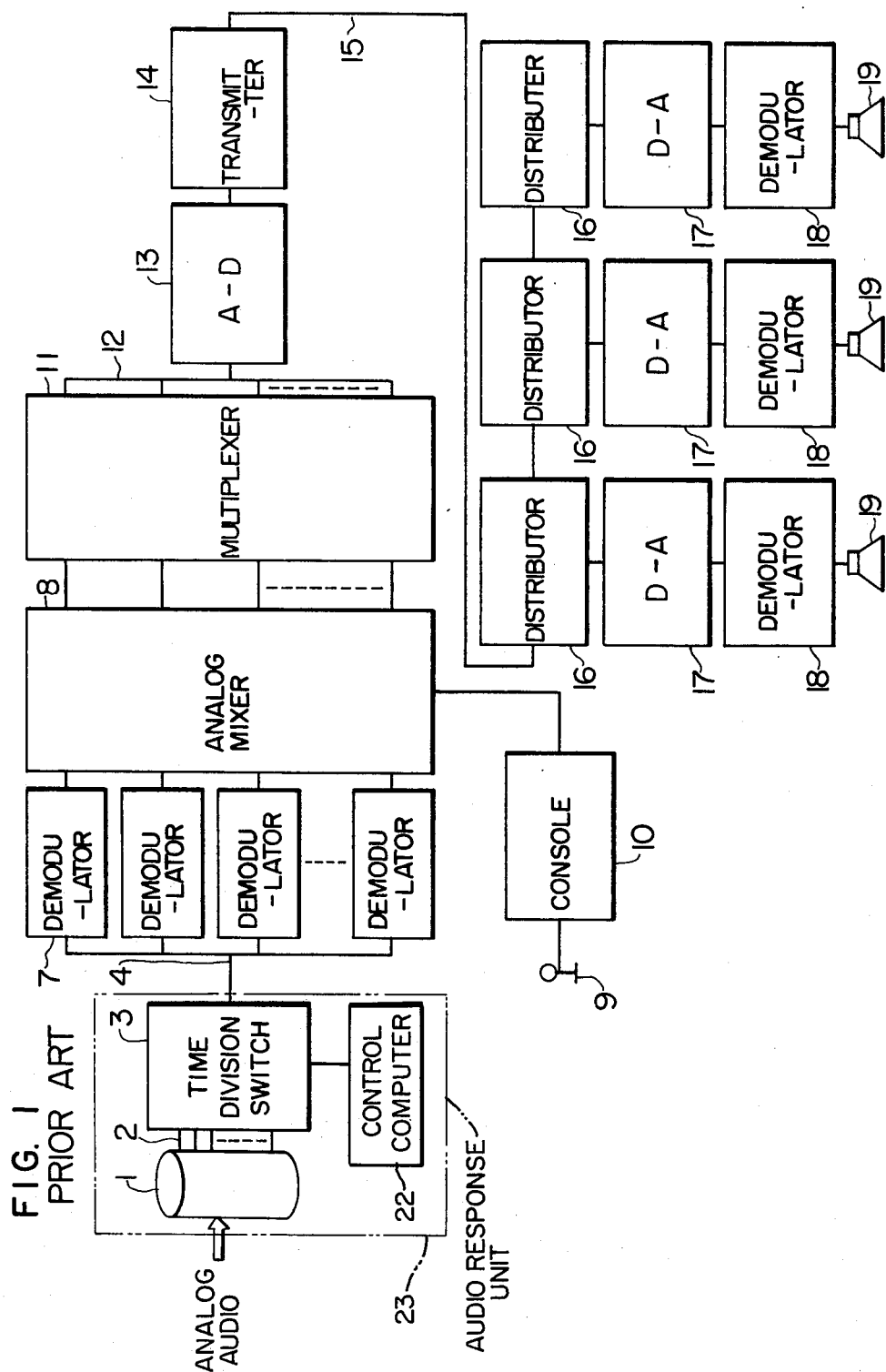
FIG. 1 is a block diagram showing the structure of one form of prior art audio transmitting and receiving system.

Referring to FIG. 1, an audio response unit 23 comprises a magnetic audio recording drum 1, a time division switch 3 and a control computer 22. Audio information is previously recorded on each track of the drum 1 in analog signal form. The audio recording drum 1 rotates at a constant speed (for example, 40 r.p.m.). Magnetic heads are provided for the respective tracks of the audio recording drum 1, and audio signals 2 are continuously and cyclically read out from the tracks through the magnetic heads to the time division switch 3. The control computer 22 applies instructions to the time division switch 3. In response thereto, the time division switch 3 samples at a constant cycle the audio signals read out from the audio recording drum 1 and converts them to a channel multiplex PAM signal 4 corresponding to the number of given channels. As a result, messages to be allotted to the individual channels are edited in the form of the channel multiplex PAM signal 4. The PAM signals corresponding to the respective channels are separated from the channel multiplex PAM signal 4 by applying channel separating pulses from a channel separating pulse generator (not shown) and are applied to associated demodulators 7. The demodulator 7 may include a filter and an amplifier. The associated PAM signal is demodulated to an analog audio signal through the filter, amplified through the amplifier and applied to an analog mixer 8. An interrupt function may be additionally required when this system is used for broadcasting and like services so that additional audio information, such as interruption broadcasting or background music, can be interrupted in the audio information allotted to the individual channels. For this purpose, an announcer actuates a control console 10 to assign an interrupted channel through a switch or the like. The audio information applied by the announcer to a microphone 9 or the audio information such as background music passes through the control console 10 to be applied to the analog mixer 8, and this additional audio information signal is mixed in separated or overlapped form with the corresponding analog signal output of the demodulator 7 in the analog mixer 8 so that the additional audio information signal can be interrupted in the analog audio signal output of the demodulator 7 corresponding to the assigned channel.

The analog signals delivered from the analog mixer 8 must be converted into PCM signals suitable for the long-distance transmission. To this end, these analog signals are applied to a multiplexer 11 to be sampled according to the order of the channels in the individual time slots, so that the analog signals are again converted into a channel multiplex PAM signal 12 corresponding to the number of channels. This channel multiplex PAM signal 12 is converted into a channel multiplex PCM (digital) signal by an A-D converter 13, and the channel multiplex PCM signal thus obtained is applied to a transmitter 14 to be sent out into a transmission path or highway 15 which may be a cable. The signals corresponding to the individual channels are separated in time division fashion from the multiplex PCM signal by respective time division distributors 16 at receiving ends. In each receiving end, the signal thus separated is converted into a PAM signal by a D-A (digital-analog) converter 17, and this PAM signal is then converted into an analog audio signal by a demodulator-amplifier 18 to be applied to a speaker 19 or the like.

However, this prior art system is defective in that the PCM means for converting an analog signal into a digital signal for transmission is required in addition to the audio response unit 23, thereby resulting in the increase in the number of the system components and complexity of the structure.

A preferred embodiment of the audio transmitting and receiving system of the present invention will be described with reference to FIG. 2.

Figure 2:
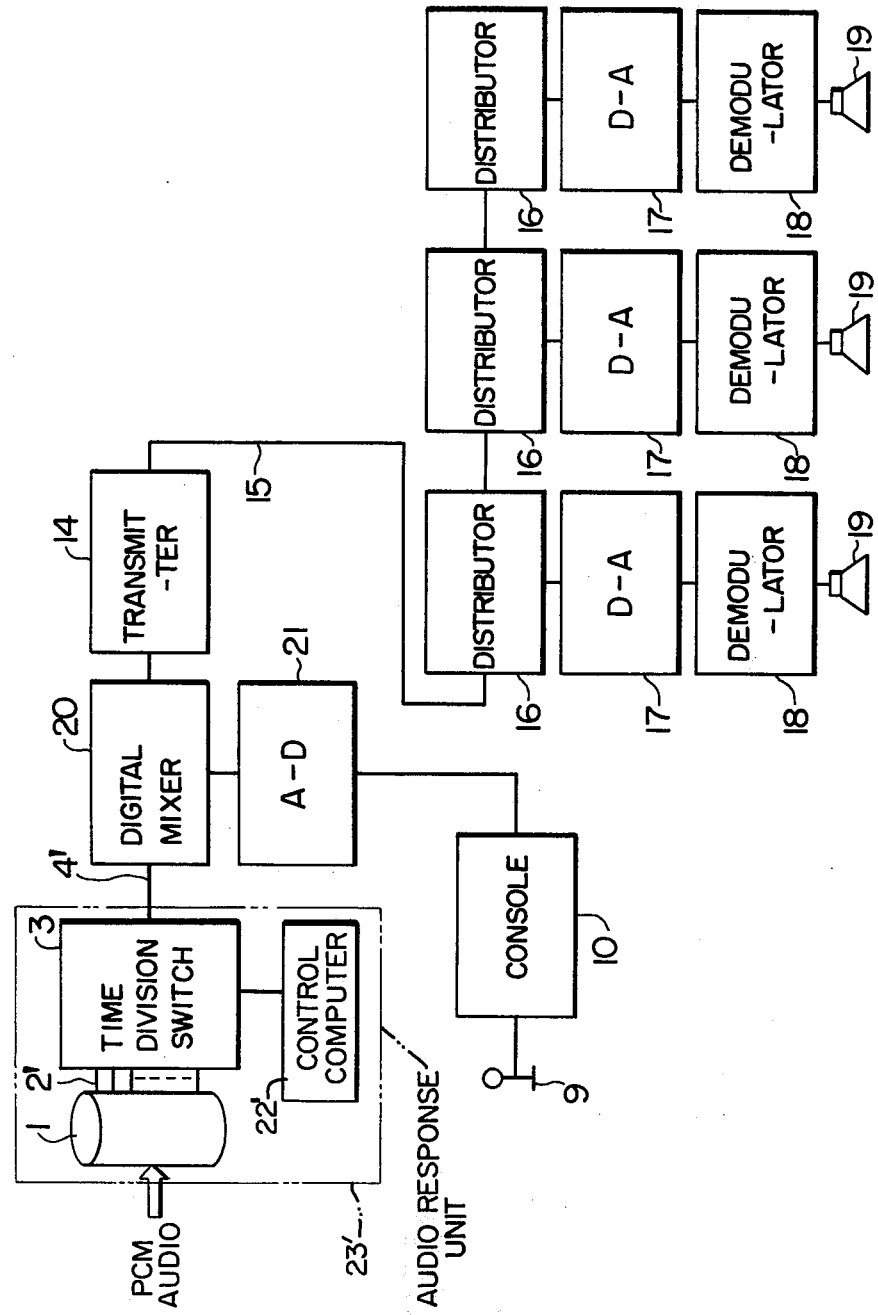
FIG. 2 is a block diagram showing the structure of a preferred embodiment of audio transmitting and receiving system according to the present invention.

Referring to FIG. 2, an audio response unit 23' comprises a magnetic audio recording drum 1, a time division 3 and a control computer 22'. The magnetic audio recording drum 1 may be of the digital type, and audio information is previously recorded on each track of the drum 1 in the form of digital signals (PCM signals). The PCM signals may be recorded on the magnetic audio recording drum 1 by any conventional means (not shown) for converting audio information into PCM signals. Magnetic heads are provided for the tracks of the audio recording drum 1, and the information recorded on the drum 1 is continuously read out from the drum 1. The read word multiplex PCM signal 2' is applied to the time division switch 3. The control computer 22' applies instructions to the time division switch 3, and the PCM signals are edited in that form in order to provide messages required for application to the individual channels. The time division switch 3 includes memory means for storing the word multiplex PCM signal 2' from the audio recording drum 1 during a predetermined sampling period, and reads out information or data necessary for the individual channels in accordance with the instructions from the control computer 22' to provide a channel multiplex PCM signal 4'. The channel multiplex PCM signal 4' is applied in that form to a transmitter 14 to be sent out into a transmission path or highway 15. The transmitter 14 may include an amplifier for amplifying the channel multiplex PCM signal 4'. The signals corresponding to the individual channels are separated in time division fashion from the transmitted channel multiplex PCM signal by respective time division distributors 16 disposed at the receiving ends. The time division distributor 16 may include an amplifier for amplifying the transmitted channel multiplex PCM signal, a circuit for extracting the timing of signals corresponding to the individual channels and a pulse form shaping circuit for shaping the amplified signal on the basis of the extracted timing to restore to a pulse train of such form as transmitted. The extraction or sampling of timing may be carried out, for example, by detecting synchronizing or marking signals (timing signals) which may be properly inserted or applied at the transmitting side to the channel multiplex PCM signal, corresponding to the individual channels. From the shaped pulse train, the time division distributor 16 also samples or separates, by means of the timing signal, only the signal corresponding to the associated channel. It is of course possible that the time division distributor 16 may be constructed only of a timing extracting circuit for extracting the timing signal corresponding to the associated channel and a gate circuit for passing only the signal corresponding to the associated channel, on the basis of the extracted timing signal. In each receiving end, the signal thus separated is converted into a PAM signal by a D-A converter 17, and this PAM signal is then converted into an analog audio signal by a demodulator-amplifier 18 to be applied to a speaker 19 or the like.

When it is required to interrupt additional audio information such as interruption broadcasting or background music in the audio information to be broadcast, an announcer actuates a control console 10 to assign the interrupted channel through a switch or the like and broadcasts this additional audio information, for example, through a microphone 9. This additional audio information signal passes through the control console 10 to be applied to an A-D converter 21 to be converted into a PCM signal. This PCM signal is mixed in digital fashion with the corresponding PCM signal output of the time division switch 3 in a digital mixer 20. This digital mixer 20 may include an adder which can change the mixing ratio between the time divided digital audio signal output of the time division switch 3 and the digital audio signal output of the microphone 9. The mixing of signals may be carried out in separated or overlapped form.

The prior art audio transmitting and receiving system has been defective in that it is complex in structure and expensive due to the fact that the audio response unit and PCM means for converting the analog signal into a digital signal for transmission are provided independently of each other at the transmitting side. In contradistinction, the components including the channel separating pulse generator, demodulators and A-D converter occupying the greater part of the equipment costs of the prior art system are unnecessary in the audio transmitting and receiving system according to the present invention, since the audio signals are edited in digital form in the audio response unit. It will thus be understood that the system according to the present invention is greatly simplified in structure compared with the prior art one and the costs thereof can be greatly reduced.

I claim:

1. An audio transmitting and receiving system comprising an audio response unit for reading out prerecorded audio information and editing it to required information, transmission means for transmitting the edited information, and conversion means at a receiving side for converting the transmitted information into an analog audio signal, the improvement in that the audio response unit includes means for editing the audio information in digital signal form to produce a digital signal; further comprising conversion means for converting audio information for interruption into a digital signal, and digital mixer means for mixing the digital signal from the conversion means with the digital signal of the audio response unit.

2. An audio transmitting and receiving system comprising an audio response unit including storage means for storing audio information in digital signal form and editing means for reading out selected audio information in digital signal form from said storage means to produce a digital output signal representing a desired message, transmission means for transmitting said digital output signal to at least one distant point, and conversion means at said distant point for converting said digital signal to an analog audio signal; further comprising conversion means for converting audio information for interruption into a digital signal, and digital mixer means for mixing the digital signal from the conversion means with the digital signal of the audio response unit.

* * * * *